(12) United States Patent
Mizuno et al.

(10) Patent No.: US 12,441,123 B2
(45) Date of Patent: Oct. 14, 2025

(54) CONVEYANCE CONTROL DEVICE, CONVEYANCE CONTROL METHOD, AND NON-TRANSITORY COMPUTER-READABLE MEDIUM STORING COMPUTER READABLE INSTRUCTIONS

(71) Applicant: BROTHER KOGYO KABUSHIKI KAISHA, Nagoya (JP)

(72) Inventors: Kodai Mizuno, Hekinan (JP); Shuichi Tamaki, Nagoya (JP); Takeshi Watanabe, Nagoya (JP); Akira Shinoda, Obu (JP); Kenji Sato, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/132,907

(22) Filed: Dec. 23, 2020

(65) Prior Publication Data

US 2021/0198062 A1    Jul. 1, 2021

(30) Foreign Application Priority Data

Dec. 25, 2019  (JP) ................. 2019-234066

(51) Int. Cl.
*B41J 3/54*     (2006.01)
*B41J 3/407*    (2006.01)
(Continued)

(52) U.S. Cl.
CPC .......... *B41J 3/543* (2013.01); *B41J 11/0015* (2013.01); *B41J 13/0009* (2013.01); *B41J 29/38* (2013.01); *B65G 37/02* (2013.01); *B41J 3/4078* (2013.01)

(58) Field of Classification Search
CPC .... B41J 11/06; B41J 11/0015; B41J 13/0009; B41J 3/543; B41J 3/4073; B41J 29/38; B41J 3/4078; B41J 11/14; B41J 11/02
See application file for complete search history.

(56) References Cited

U.S. PATENT DOCUMENTS 10,189,278 B1    1/2019  Friedrich et al.
2006/0207448 A1   9/2006  Fresener
(Continued)

FOREIGN PATENT DOCUMENTS

CN    101376297 A    3/2009
CN    102582244 A    7/2012
(Continued)

OTHER PUBLICATIONS

Extended European Search Report issued on Apr. 13, 2021 in related European Patent Application No. 20216839.9.
(Continued)

*Primary Examiner* — Jannelle M Lebron
(74) *Attorney, Agent, or Firm* — K&L Gates LLP

(57) ABSTRACT

A conveyance control device of the present disclosure is provided with a CPU that controls a platen conveyance mechanism that conveys a platen from a preparation position of the platen to one of a plurality of printers via a pretreatment device that performs pretreatment on a cloth placed on the platen. The CPU performs determination processing of determining which of the plurality of printers the platen is to be conveyed to. Thus, conveyance destinations of the platens are allocated to the plurality of printers. Thus, the conveyance of the platens to a specific printer only is avoided, and a print processing volume in a certain period is increased.

15 Claims, 10 Drawing Sheets

(51) Int. Cl.
  *B41J 11/00*  (2006.01)
  *B41J 13/00*  (2006.01)
  *B41J 29/38*  (2006.01)
  *B65G 37/02*  (2006.01)

(56) References Cited

U.S. PATENT DOCUMENTS

| | | |
|---|---|---|
| 2006/0249039 A1 | 11/2006 | Feldman et al. |
| 2007/0146455 A1 | 6/2007 | Nakashima et al. |
| 2007/0216924 A1 | 9/2007 | Watanabe |
| 2009/0056567 A1 | 3/2009 | Ando et al. |
| 2009/0056569 A1 | 3/2009 | Ando et al. |
| 2009/0097044 A1 | 4/2009 | Zach |
| 2013/0269551 A1 | 10/2013 | Till et al. |
| 2013/0293652 A1* | 11/2013 | Spence ............ B65H 3/0816 271/225 |
| 2013/0293653 A1 | 11/2013 | Spence et al. |
| 2015/0077488 A1 | 3/2015 | Mozel et al. |
| 2015/0273866 A1 | 10/2015 | Sakai |
| 2018/0056679 A1 | 3/2018 | Vest et al. |
| 2018/0264845 A1* | 9/2018 | Gertlowski ............ B41J 3/4073 |
| 2018/0339510 A1 | 11/2018 | Ben-Zur et al. |
| 2019/0111709 A1 | 4/2019 | Weber et al. |
| 2019/0193422 A1 | 6/2019 | Ferrari et al. |
| 2019/0248128 A1 | 8/2019 | Sharp et al. |
| 2019/0299663 A1 | 10/2019 | Takagiwa |
| 2020/0230946 A1 | 7/2020 | Li et al. |
| 2021/0107291 A1 | 4/2021 | Hong et al. |
| 2021/0331506 A1 | 10/2021 | Schiestl |
| 2022/0212462 A1 | 7/2022 | Friedrich et al. |

FOREIGN PATENT DOCUMENTS

| | | |
|---|---|---|
| CN | 204774081 U | 11/2015 |
| CN | 205523001 U | 8/2016 |
| CN | 107310268 A | 11/2017 |
| CN | 107487070 A | 12/2017 |
| CN | 108394185 A | 8/2018 |
| CN | 109435501 A | 3/2019 |
| CN | 109664613 A | 4/2019 |
| CN | 109890616 A | 6/2019 |
| EP | 2033784 A1 | 3/2009 |
| EP | 1981715 B1 | 9/2014 |
| JP | H11282643 A | 10/1999 |
| JP | 2001162898 A | 6/2001 |
| JP | 2001331292 A | 11/2001 |
| JP | 2002103735 A | 4/2002 |
| JP | 2004246664 A | 9/2004 |
| JP | 2005059280 A | 3/2005 |
| JP | 2007118256 A | 5/2007 |
| JP | 2007130777 A | 5/2007 |
| JP | 2013233800 A | 11/2013 |
| JP | 2013234069 A | 11/2013 |
| JP | 2015116812 A | 6/2015 |
| JP | 2015132896 A | 7/2015 |
| JP | 2015183331 A | 10/2015 |
| JP | 2018105926 A | 7/2018 |
| JP | 2019178008 A | 10/2019 |
| WO | 2018060823 A1 | 4/2018 |
| WO | 2019/205473 A1 | 10/2019 |

OTHER PUBLICATIONS

Extended European Search Report issued on Apr. 19, 2021 in related European Patent Application No. 20216841.5.
Chinese Office Action mailed Mar. 1, 2022, in corresponding Chinese Patent Application No. 202011510224.9 (15 pages).
New U.S. patent application claiming priority to JP Application No. 2019-234067.
Chinese Office Action mailed Feb. 11, 2022, in corresponding Chinese Patent Application No. 202011501935.X (13 pages).
Office Action issued in related European Patent Application No. 20216839.9, dated Nov. 23, 2022. (8 pages.).
Office Action issued in related European Patent Application No. 20216841.5, dated Nov. 23, 2022. (9 pages.).
Office Action issued in related U.S. Appl. No. 17/132,917, dated Oct. 6, 2022. (13 pages.).
Office Action issued in corresponding Chinese Patent Application No. 202011501935.X, dated Sep. 30, 2022. (3 pages.).
Office Action issued in related Chinese Patent Application No. 202011501935.X, dated Apr. 1, 2023. (3 pages.).
Office Action issued in related Japanese Patent Application No. 2019-234066, dated May 23, 2023. (3 pages.).
Office Action issued in related Japanese Patent Application No. 2019-234067 dated May 23, 2023. (3 pages.).
Office Action issued in related U.S. Appl. No. 17/132,917, dated Jun. 8, 2023. (12 pages.).
Office Action issued in related Japanese Patent Application No. 2019-234066, dated Dec. 19, 2023. (2 pages.).
Office Action issued in related U.S. Appl. No. 17/132,917, dated Dec. 13, 2023. (13 pages.).
Office Action issued in related European Patent Application No. 20216839.9, dated Dec. 6, 2023. (5 pages.).
Office Action issued in related European Patent Application No. 20216841.5, dated Dec. 6, 2023. (5 pages.).
Office Action issued in related U.S. Appl. No. 17/132,917, dated Jul. 3, 2024. (16 pages.).
Office Action issued in corresponding Japanese patent application No. 2024-043407 dated Dec. 3, 2024. (7 pages.).
Non-Final Office Action issued in U.S. Appl. No. 17/132,917, dated Dec. 18, 2024. (19 pages.).

* cited by examiner

FIG. 6

| STATE | PRIORITY | DETAILS OF STATE | SUPPLEMENTARY INFORMATION |
|---|---|---|---|
| PRINTING POSSIBLE | 1 | PRINTING POSSIBLE (NO PLATEN) | |
| | 2 | PRINTING IN PROGRESS (20 SECONDS OR LESS UNTIL PRINTING IS COMPLETE) | PRIORITY IS HIGHER THE SHORTER THE TIME PERIOD UNTIL START |
| | 3 | PRINTING IN PROGRESS (20 SECONDS OR MORE AND 40 SECONDS OR LESS UNTIL PRINTING IS COMPLETE) | |
| | 4 | PRINTING IN PROGRESS (10 SECONDS FOR CONVEYANCE AND 40 SECONDS OR MORE AND 60 SECONDS OR LESS FOR PRINTING) | |
| | 5 | PRINTING IN PROGRESS (30 SECONDS FOR MAINTENANCE AND 40 SECONDS OR MORE AND 60 SECONDS OR LESS FOR PRINTING) | |
| PRINTING NOT POSSIBLE | 6 | PERIODIC REPLACEMENT IN PROGRESS (INK REPLENISHMENT IN PROGRESS) | PERIODIC OPERATION |
| | 7 | PLATEN DISCHARGE IN PROGRESS | PERIODIC OPERATION |
| | 8 | PURGING IN PROGRESS | PERIODIC OPERATION |
| | × | POWER SOURCE OFF | IRREGULAR OPERATION |
| | × | MACHINE ERROR (SUCH AS INK EMPTY) | IRREGULAR OPERATION |
| | × | OPENING OF PRINTER COVER | IRREGULAR OPERATION |

| CONVEYANCE CONDITIONS TO PRINTER 3 | | | | |
|---|---|---|---|---|
| STANDBY POSITION | FIRST CONVEYANCE PATH | SECOND CONVEYANCE PATH (ENTER) | PRINTER 3 | SECOND CONVEYANCE PATH (EXIT) |
| -- | × | × | × | × |
| THIRD CONVEYANCE PATH | FOURTH CONVEYANCE PATH (ENTER) | PRINTER 4 | FOURTH CONVEYANCE PATH (EXIT) | FIFTH CONVEYANCE PATH |
| Any | Any | Any | Any | Any |
| SIXTH CONVEYANCE PATH (ENTER) | PRINTER 5 | SIXTH CONVEYANCE PATH (EXIT) | SEVENTH CONVEYANCE PATH | |
| Any | Any | Any | Any | |

FIG. 7B

| CONVEYANCE CONDITIONS TO PRINTER 4 | | | | |
|---|---|---|---|---|
| STANDBY POSITION | FIRST CONVEYANCE PATH | SECOND CONVEYANCE PATH (ENTER) | PRINTER 3 | SECOND CONVEYANCE PATH (EXIT) |
| — | × | × | AFTER COMPLETION OF PRINTING: × PLATEN TOWARD FIFTH CONVEYANCE PATH: GO | × |
| THIRD CONVEYANCE PATH | FOURTH CONVEYANCE PATH (ENTER) | PRINTER 4 | FOURTH CONVEYANCE PATH (EXIT) | FIFTH CONVEYANCE PATH |
| PLATEN TOWARD FOURTH CONVEYANCE PATH: × PLATEN TOWARD FIFTH CONVEYANCE PATH: GO | × | × | Any | Any |
| SIXTH CONVEYANCE PATH (ENTER) | PRINTER 5 | SIXTH CONVEYANCE PATH (EXIT) | SEVENTH CONVEYANCE PATH | |
| Any | Any | Any | Any | |

FIG. 7C

| CONVEYANCE CONDITIONS TO PRINTER 5 | | | | |
|---|---|---|---|---|
| STANDBY POSITION | FIRST CONVEYANCE PATH | SECOND CONVEYANCE PATH (ENTER) | PRINTER 3 | SECOND CONVEYANCE PATH (EXIT) |
| -- | × | Any | AFTER COMPLETION OF PRINTING: × PRINTING IN PROGRESS/ MAINTENANCE IN PROGRESS/OUT OF ORDER: GO | × |
| THIRD CONVEYANCE PATH | FOURTH CONVEYANCE PATH (ENTER) | PRINTER 4 | FOURTH CONVEYANCE PATH (EXIT) | FIFTH CONVEYANCE PATH |
| PLATEN TOWARD SIXTH CONVEYANCE PATH: × PLATEN TOWARD FOURTH AND SEVENTH CONVEYANCE PATHS: GO | Any | AFTER COMPLETION OF PRINTING: × PRINTING IN PROGRESS/ MAINTENANCE IN PROGRESS/OUT OF ORDER: GO | Any | PLATEN TOWARD SIXTH CONVEYANCE PATH: × PLATEN TOWARD SEVENTH CONVEYANCE PATH: GO |
| SIXTH CONVEYANCE PATH (ENTER) | PRINTER 5 | SIXTH CONVEYANCE PATH (EXIT) | SEVENTH CONVEYANCE PATH | |
| × | × | Any | Any | |

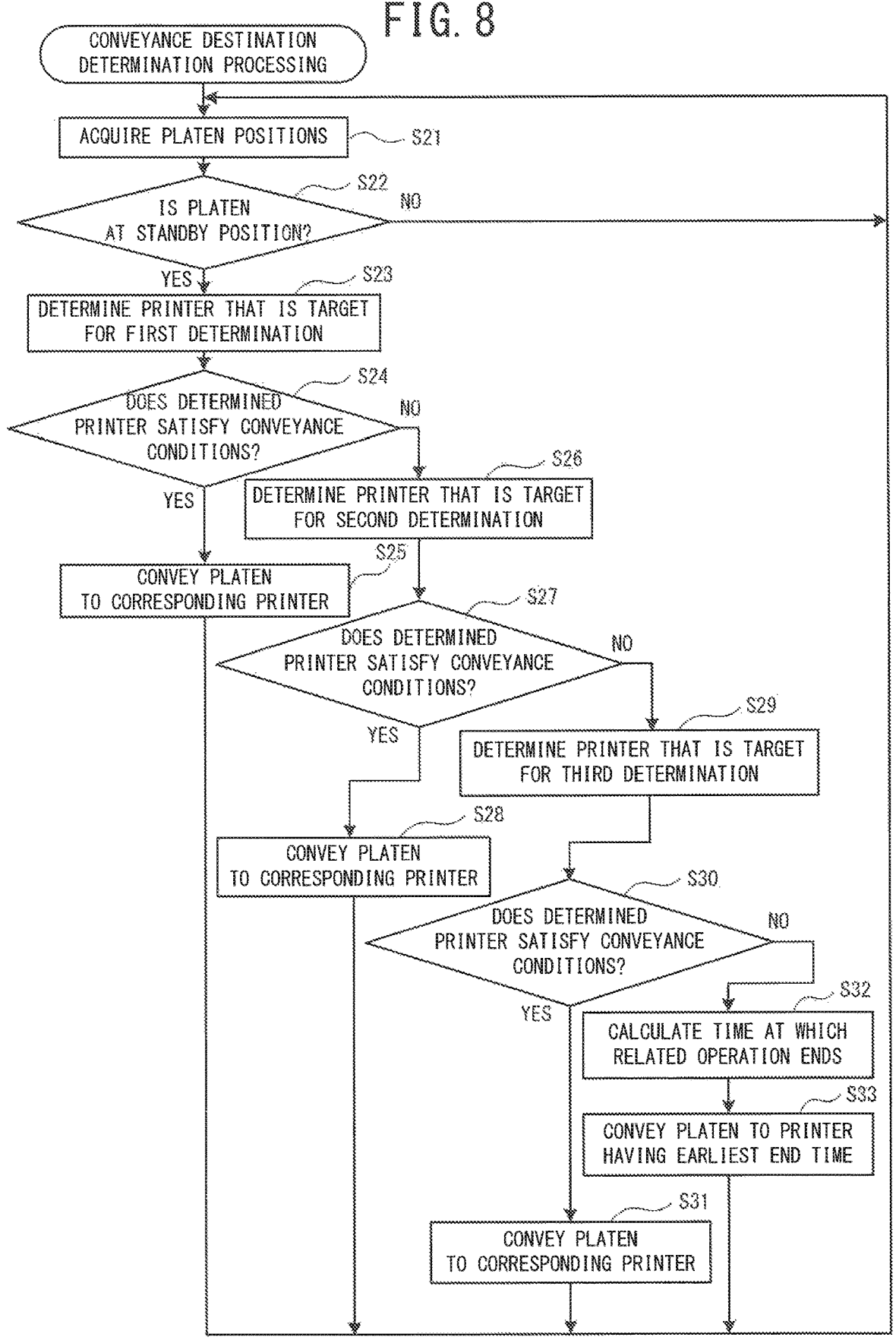

US 12,441,123 B2

CONVEYANCE CONTROL DEVICE, CONVEYANCE CONTROL METHOD, AND NON-TRANSITORY COMPUTER-READABLE MEDIUM STORING COMPUTER READABLE INSTRUCTIONS

CROSS-REFERENCE TO RELATED APPLICATION

This application claims priority to Japanese Patent Application No. 2019-234066 filed Dec. 25, 2019. The contents of the foregoing application are hereby incorporated herein by reference.

BACKGROUND

The present disclosure relates to a conveyance control device, a conveyance control method, and a non-transitory computer-readable medium storing computer-readable instructions.

A printing device being provided with a pretreatment agent application portion and a print portion is known. The pretreatment agent application portion applies a pretreatment agent onto a recording medium placed on a platen. A movement mechanism conveys the platen from the pretreatment agent application portion to the print portion, and the print portion performs printing by applying a printing liquid onto the recording medium to which the pretreatment agent has been applied.

SUMMARY

In order to increase a print processing volume in a certain period, it is conceivable to provide a print system that is provided with a plurality of printers. In the print system, it is conceivable to provide a conveyance portion that can convey the platen to a set position, at which the recording medium is set on the platen, to a pretreatment device, and to any one of the plurality of printers. In the print system, when the platen is conveyed to a specific printer only, this is not desirable from a viewpoint of increasing the print processing volume in the certain period.

Embodiments of the broad principles derived herein provide a conveyance control device, a conveyance control method, and a non-transitory computer-readable medium storing computer-readable instructions that increase a print processing number in a certain period.

A conveyance control device according to a first aspect of the present disclosure includes a processor configured to control a conveyance portion, the conveyance portion being configured to convey a platen from a conveyance start position of the platen to one of a plurality of printers via a pretreatment device, the pretreatment device being configured to perform pretreatment on a recording medium placed on the platen, and a memory storing computer-readable instructions that, when executed by the processor, perform processes including: performing determination processing of determining which of the plurality of printers the platen is to be conveyed to.

Since the processor determines which of the plurality of printers the platen is to be conveyed to, conveyance destinations of the platens are allocated to the plurality of printers. Thus, the conveyance of the platens to a specific printer only is avoided, and a print processing volume in a certain period is increased.

A conveyance control method according to a second aspect of the present disclosure is a method in which a processor controls a conveyance portion, the conveyance portion being configured to convey a platen from a conveyance start position of the platen to one of a plurality of printers via a pretreatment device, the pretreatment device being configured to perform pretreatment on a recording medium placed on the platen, the conveyance control method includes determination processing of determining which of the plurality of printers the platen is to be conveyed to.

A non-transitory computer-readable medium storing computer-readable instructions according to a third aspect of the present disclosure, stores the computer-readable instructions that, when executed by a computer which controls a conveyance portion, the conveyance portion being configured to convey a platen from a conveyance start position of the platen to one of a plurality of printers via a pretreatment device, the pretreatment device being configured to perform pretreatment on a recording medium placed on the platen, performs determination processing of determining which of the plurality of printers the platen is to be conveyed to.

BRIEF DESCRIPTION OF THE DRAWINGS

Embodiments will be described below in detail with reference to the accompanying drawings in which:

FIG. 6 is a priority table 104A;

FIG. 7(A), FIG. 7(B), and FIG. 7(C) are tables showing conveyance conditions to printers; and FIG. 8 is a flowchart of a modified example of the conveyance destination determination processing.

DETAILED DESCRIPTION

Figure 1:
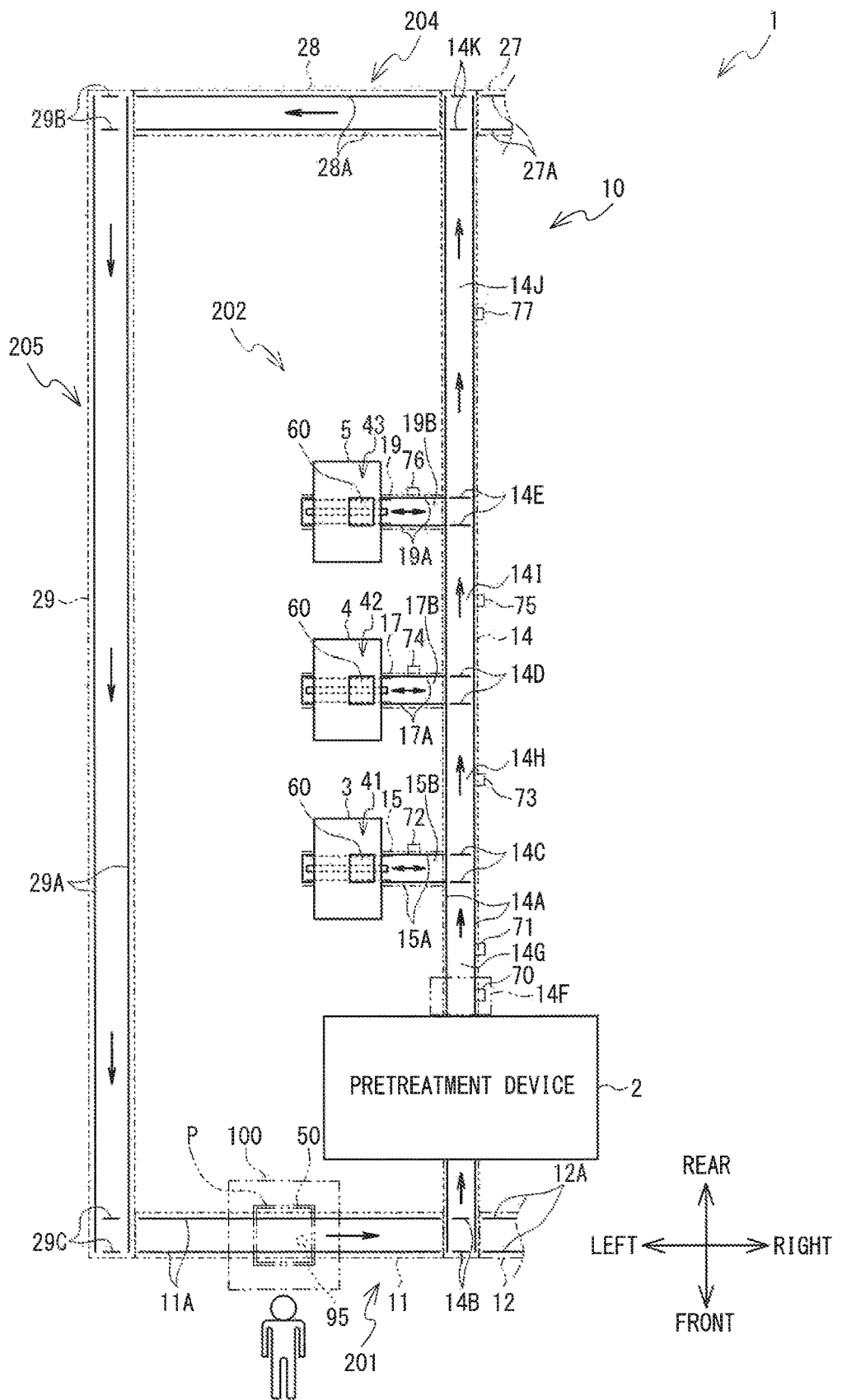
FIG. 1 is a plan view of a print system 1.

An embodiment of the present disclosure will be explained. Left and right, front and rear, and up and down directions shown by arrows in the drawings are used in the following explanation. A print system 1 shown in FIG. 1 is a system that sequentially performs pretreatment and print processing on a recording medium placed on a platen 50 while conveying the platen 50. The recording medium is a cloth, such as a T-shirt or the like. The material of the cloth is cotton, polyester, a mixture of cotton and polyester, or the like.

The configuration of the print system 1 will be explained with reference to FIG. 1. The print system 1 is provided with a pretreatment device 2, printers 3, 4, and 5, a platen conveyance mechanism 10, a code reader 95, and the like. The pretreatment device 2 is disposed to the front of the print system 1, and performs the pretreatment on a cloth P placed on the platen 50. For example, the pretreatment device 2 is provided with an application portion and a heat treatment portion that are not shown in the drawings. The application portion sprays a pretreatment agent using a spray, and applies the pretreatment agent onto the cloth P placed on the platen 50. The pretreatment agent is a base coat agent that is applied before ink is applied onto the cloth P. The pretreatment agent is a liquid to form a film between fibers of the cloth so that the ink is fixed on the cloth more effectively, and contains resin components, for example. The pretreatment agent contains, for example, a divalent metal salt (such as $CaCl_2$, $Ca(NO_2)_2$, or the like), and enhances color development of the ink. For example, the heat treatment portion is a heat press portion, which dries the pretreatment agent by pressurizing the cloth P at a high temperature. Thus, fixation of the pretreatment agent on the cloth P is improved, and image quality is improved. The pretreatment device 2 may omit one of the application portion and the heat treatment portion.

The printers 3 to 5 are positioned to the rear of the pretreatment device 2, and are aligned in the front-rear direction. The printers 3 to 5 are inkjet printers. The printers 3 to 5 perform printing by ejecting ink from nozzles of a print head onto the cloth P after the pretreatment that is placed on the platen 50. For example, the printers 3 to 5 eject five types of ink (white (W), black (K), yellow (Y), cyan (C) and magenta (M) inks). The platen conveyance mechanism 10 conveys the platen 50 disposed at a preparation position 100 (to be described later) from the preparation position 100, which is a conveyance start position of the platen 50, to one of the printers 3 to 5 via the pretreatment device 2, and once more returns the platen 50 to the preparation position 100.

The code reader 95 provided at the preparation position 100 reads out an identification information portion (not shown in the drawings) provided on the cloth P, and inputs identification information to a CPU 101 (to be described later) of the print system 1. The identification information is information to identify the cloth P, and is, for example, information of a one-dimensional code, such as a bar code, a two-dimensional code, such as a QR code, or a three-dimensional code. The identification information includes information of at least a type, color and size of the cloth P, a print color, a print size, and the like.

The configuration of the platen conveyance mechanism 10 will be explained with reference to FIG. 1. The platen conveyance mechanism 10 is provided with at least a shipment line 201, a processing line 202, a first return line 204, and a second return line 205.

The shipment line 201 is positioned at the forefront of the print system 1 and extends linearly in the left-right direction. The shipment line 201 is used to convey the platen 50 toward the processing line 202 to be described later. The shipment line 201 is provided with conveyance mechanisms 11 and 12 in that order from the left side. The conveyance mechanism 11 is provided with the preparation position 100. The preparation position 100 is a position for preparation at which the cloth P is initially attached to the platen 50. The conveyance mechanism 11 conveys the platen 50 to the right. A front end portion of a conveyance mechanism 14 to be described later is positioned between the conveyance mechanisms 11 and 12. The right end side of the conveyance mechanism 12 may be connected to a processing line other than the processing line 202.

The processing line 202 extends in the front-rear direction between the shipment line 201 and the first return line 204 to be described later. The shipment line 202 is used to convey the platen 50 received from the shipment line 201 to the pretreatment device 2 and to one of the printers 3 to 5, in that order, and to deliver the platen 50 to the first return line 204.

The processing line 202 is provided with the conveyance mechanism 14, conveyance mechanisms 15, 17 and 19, and print conveyance mechanisms 41 to 43. The conveyance mechanism 14 extends to the rear from the right end side of the conveyance mechanism 11 of the shipment line 201, passes through the interior of the pretreatment device 2, and further extends to the rear. The conveyance mechanism 14 receives the platen 50 from the conveyance mechanism 11, passes through the pretreatment device 2, and conveys the platen 50 to the rear. The conveyance mechanism 15 is positioned to the rear of the pretreatment device 2, and extends to the left from the conveyance mechanism 14 toward the printer 3. The conveyance mechanism 15 receives the platen 50 from the conveyance mechanism 14, and conveys the platen 50 toward the printer 3. The conveyance mechanism 15 conveys the platen 50 to the right after the printing is completed by the printer 3, and transfers the platen 50 to the conveyance mechanism 14.

The conveyance mechanism 17 is positioned to the rear of the conveyance mechanism 15, and extends to the left from the conveyance mechanism 14 toward the printer 4. The conveyance mechanism 17 receives the platen 50 from the conveyance mechanism 14, and conveys the platen 50 toward the printer 4. The conveyance mechanism 17 conveys the platen 50 to the right after the printing is completed by the printer 4, and transfers the platen 50 to the conveyance mechanism 14. The conveyance mechanism 19 is positioned to the rear of the conveyance mechanism 17, and extends to the left from the conveyance mechanism 14 toward the printer 5. The conveyance mechanism 19 receives the platen 50 from the conveyance mechanism 14, and conveys the platen 50 toward the printer 5. The conveyance mechanism 19 conveys the platen 50 to the right after the printing is completed by the printer 5, and transfers the platen 50 to the conveyance mechanism 14.

The printer 3 is provided with the print conveyance mechanism 41. The print conveyance mechanism 41 can convey the platen 50 in the left-right direction. The print conveyance mechanism 41 is provided with a platen support member 60 and a conveyance motor 137 (refer to FIG. 3). The platen support member 60 receives the platen 50 from the conveyance mechanism 15 and supports the platen 50. The conveyance motor 137 conveys the platen support member 60 in the left-right direction. The printer 4 is provided with the print conveyance mechanism 42, and the printer 5 is provided with the print conveyance mechanism 43. The print conveyance mechanisms 42 and 43 have the same configuration as the print conveyance mechanism 41, and an explanation thereof is thus omitted here.

The conveyance mechanism 12 of the shipment line 201 may convey the platen 50 toward another processing line (not shown in the drawings). When the other processing line is provided, the other processing line may have the same configuration as the processing line 202. The first return line 204 is positioned at the rearmost portion of the print system 1, and extends linearly in the left-right direction. The first return line 204 is used to convey the platen 50 toward the second return line 205. The first return line 204 is provided with conveyance mechanisms 28 and 27 in that order from the left side. The conveyance mechanism 27 conveys the platen 50 received from another processing line (not shown in the drawings) to the left.

A belt configuration of the platen conveyance mechanism 10 will be explained with reference to FIG. 1. First, the belt configuration of the shipment line 201 will be explained. The conveyance mechanism 11 is provided with a pair of lateral belts 11A. The lateral belts 11A are provided at both end portions of the conveyance mechanism 11 in a direction orthogonal to a conveyance direction, and may convey the platen 50 to the right.

The conveyance mechanism 14 is provided with a pair of longitudinal belts 14A and pairs of lateral lifting belts 14B to 14E. The pair of longitudinal belts 14A are provided at both end portions of the conveyance mechanism 14 in a direction orthogonal to the conveyance direction. The pair of longitudinal belts 14A convey the platen 50 to the rear. The pairs of lateral lifting belts 14B to 14E are disposed between the pair of longitudinal belts 14A. The pair of lateral lifting belts 14B are provided at the front end portion of the conveyance mechanism 14 such that they can be raised and lowered. The pair of lateral lifting belts 14B convey the platen 50 to the right. The pair of lateral lifting belts 14C are provided on the right side of the conveyance mechanism 15 such that they can be raised and lowered. The pair of lateral lifting belts 14D are provided on the right side of the conveyance mechanism 17 such that they can be raised and lowered. The pair of lateral lifting belts 14E are provided on the right side of the conveyance mechanism 19 such that they can be raised and lowered. The pairs of lateral lifting belts 14C to 14E convey the platen 50 to the left.

The conveyance mechanisms 15, 17 and 19 are respectively provided with pairs of lateral conveyance belts 15A, 17A and 19A. The pairs of lateral conveyance belts 15A, 17A and 19A are respectively provided at both end portions of the conveyance mechanisms 15, 17 and 19 in a direction orthogonal to the conveyance direction such that they can be raised and lowered.

The conveyance mechanisms 27 and 28 are respectively provided with pairs of lateral belts 27A and 28A that extend in the conveyance direction, and convey the platen 50 in the conveyance direction in the conveyance mechanisms 27 and 28. A conveyance mechanism 29 is provided with a pair of longitudinal belts 29A and pairs of lateral lifting belts 29B and 29C. The pair of longitudinal belts 29A are provided at both end portions of the conveyance mechanism 29 in a direction orthogonal to the conveyance direction. The pair of longitudinal belts 29A convey the platen 50 to the front. The pairs of lateral lifting belts 28B and 29C are disposed between the pair of longitudinal belts 29A, and can be raised and lowered on the left side of the conveyance mechanisms 28 and 11, respectively. The pair of lateral lifting belts 29B convey the platen 50 to the left, and the pair of lateral lifting belts 29C convey the platen 50 to the right.

Figure 3:
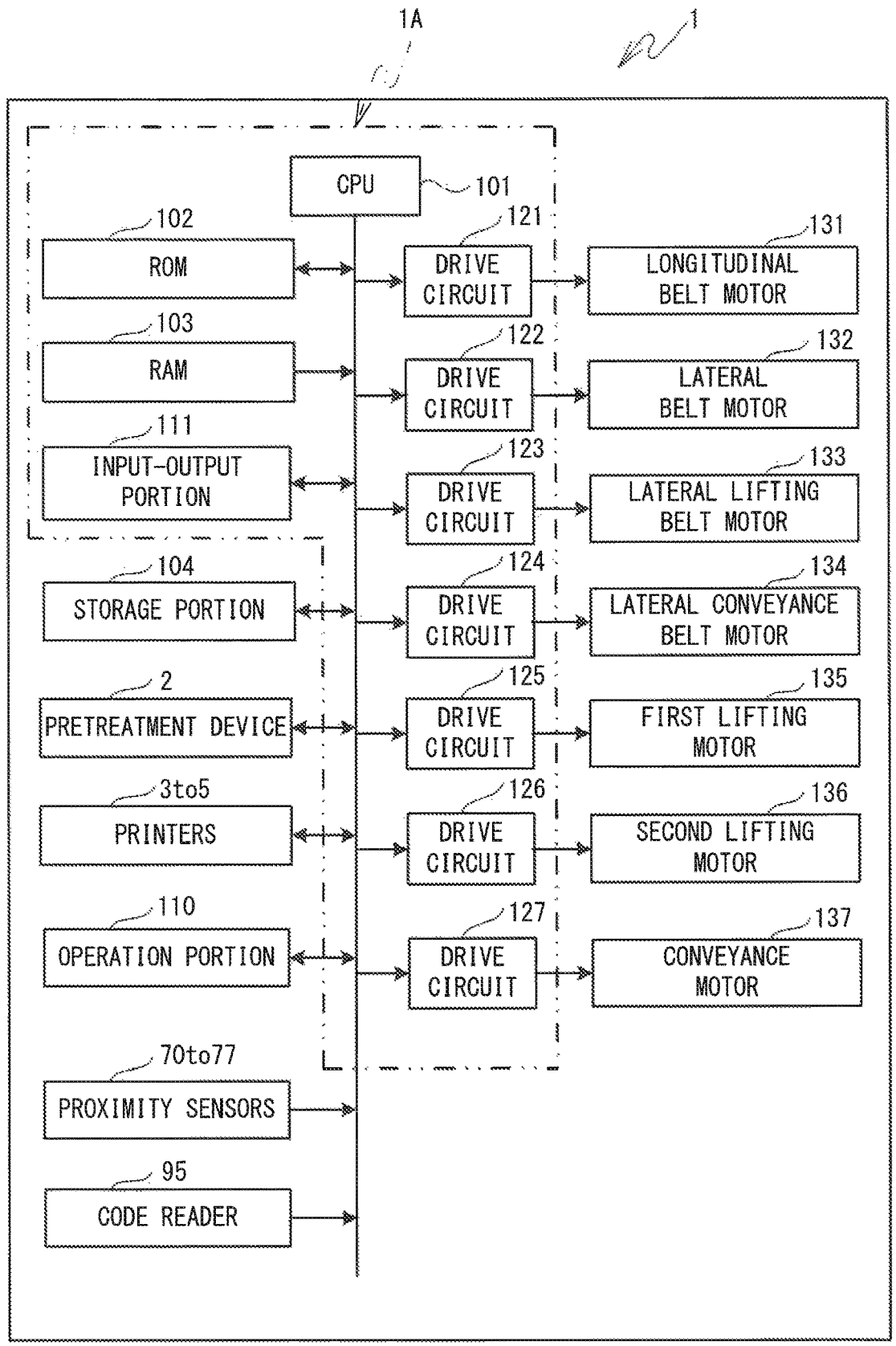
FIG. 3 is a block diagram showing an electrical configuration of the print system 1.

As shown in FIG. 3, the platen conveyance mechanism 10 is provided with a longitudinal belt motor 131, a lateral belt motor 132, a lateral lifting belt motor 133, a lateral conveyance belt motor 134, a first lifting motor 135, a second lifting motor 136, the conveyance motor 137, and the like. The longitudinal belt motor 131 is provided so as to correspond to each of the longitudinal belts 14A and 29A, and drives each of the belts. The lateral belt motor 132 is provided so as to correspond to each of the lateral belts 11A, 12A, 27A and 28A, and drives each of the belts. The lateral lifting belt motor 133 is provided so as to correspond to each of the lateral lifting belts 14B to 14E, and drives each of the belts. The lateral conveyance belt motor 134 is provided so as to correspond to each of the lateral conveyance belts 15A, 17A and 19A, and drives each of the belts. The first lifting motor 135 is provided so as to correspond to each of the lateral lifting belts 14B to 14E and lateral lifting belts 14K, and raises and lowers each of the belts. The second lifting motor 136 is provided so as to correspond to each of the lateral conveyance belts 15A, 17A and 19A, and raises and lowers each of the belts.

As shown in FIG. 1, a standby position 14F is provided at an exit of the pretreatment device 2 of the conveyance mechanism 14. The platen 50 after the pretreatment may stand by at the standby position 14F until it is conveyed to one of the printers 3 to 5. In the explanation below, a section of the conveyance mechanism 14 from the standby position 14F to the lateral lifting belts 14C will be referred to as a first conveyance path 14G. A section of the conveyance mechanism 15 from the left side of the lateral lifting belts 14C to a right-side end portion of the printer 3 will be referred to as a second conveyance path 15B. A section of the conveyance mechanism 14 from the rear side of the lateral lifting belts 14C to the lateral lifting belts 14D will be referred to as a third conveyance path 14H. A section of the conveyance mechanism 17 from the left side of the lateral lifting belts 14D to a right-side end portion of the printer 4 will be referred to as a fourth conveyance path 17B. A section of the conveyance mechanism 14 from the rear side of the lateral lifting belts 14D to the lateral lifting belts 14E will be referred to as a fifth conveyance path 14I. A section of the conveyance mechanism 19 from the left side of the lateral lifting belts 14E to a right-side end portion of the printer 5 will be referred to as a sixth conveyance path 19B. A remaining section of the conveyance mechanism 14 from the rear side of the lateral lifting belts 14E to the lateral lifting belts 14K will be referred to as a seventh conveyance path 14J.

Platen Conveyance Operation

An example of the platen conveyance operation by the platen conveyance mechanism 10 will be explained with reference to FIG. 1. Sensors (not shown in the drawings) are respectively disposed at positions of the respective lateral lifting belts, and detect whether the platen 50 is present or not. On the basis of an output from each of the sensors, the CPU 101 controls the driving and the upward and downward movement of each of the belts. When the conveyance of the platen 50 from the preparation position 100 is instructed, the lateral belts 11A are driven and convey the platen 50 to the right. At this time, the lateral lifting belts 14B are disposed at the same height position as the lateral belts 11A, and deliver the platen 50 from the lateral belts 11A to the lateral lifting belts 14B. After that, the driving of the lateral lifting belts 14B is stopped and the lateral lifting belts 14B are lowered. At the same time, the longitudinal belts 14A are driven. The lateral lifting belts 14B are lowered to be lower than the longitudinal belts 14A, and the platen 50 is placed on the longitudinal belts 14A. The longitudinal belts 14A convey the platen 50 to the rear, and convey the platen 50 to the pretreatment device 2. The pretreatment device 2 performs the pretreatment on the cloth P. After that, the longitudinal belts 14A further convey the platen 50 to the rear, and the platen 50 stands by at the standby position 14F.

When the platen 50 is conveyed to the printer 3, when the platen 50 reaches a position above the lateral lifting belts 14C, the driving of the longitudinal belts 14A is stopped, and the upward movement of the lateral lifting belts 14C is started. The lateral lifting belts 14C are raised to be higher than the longitudinal belts 14A, and are stopped at the same height position as the lateral conveyance belts 15A. The lateral conveyance belts 15A and the longitudinal lifting belts 14C are driven, and deliver the platen 50 from the lateral lifting belts 14C to the lateral conveyance belts 15A. The lateral conveyance belts 15A are driven, and convey the platen 50 toward the printer 3. The platen 50 is delivered from the lateral conveyance belts 15A to the platen support member 60 (to be described later) provided inside the printer 3. When the platen 50 is conveyed to the printer 4, when the platen 50 reaches a position above the lateral lifting belts 14D, the driving of the longitudinal belts 14A is stopped, and the upward movement of the lateral lifting belts 14D is started. The lateral lifting belts 14D are raised to be higher than the longitudinal belts 14A, and are stopped at the same height position as the lateral conveyance belts 17A. The lateral conveyance belts 17A and the lateral lifting belts 14D are driven, and deliver the platen 50 from the lateral lifting belts 14D to the lateral conveyance belts 17A. When the platen 50 is conveyed to the printer 5, when the platen 50 reaches a position above the lateral lifting belts 14E, the driving of the longitudinal belts 14A is stopped, and the upward movement of the lateral lifting belts 14E is started. The lateral lifting belts 14E are raised to be higher than the longitudinal belts 14A, and are stopped at the same height position as the lateral conveyance belts 19A. The lateral conveyance belts 19A and the lateral lifting belts 14E are driven, and deliver the platen 50 from the lateral lifting belts 14E to the lateral conveyance belts 19A.

When the platen 50 is conveyed to the printer 3, the platen support member 60 supports the platen 50. The platen support member 60 conveys the platen 50 in the leftward direction. The platen 50 passes through the interior of the printer 3, and is stopped at a left end position of the printer 3. When the printing is complete, the platen support member 60 conveys the platen 50 in the rightward direction, and delivers the platen 50 to the lateral conveyance belts 15A. The lateral conveyance belts 15A are driven in the rightward direction, and convey the platen 50 in the rightward direction. The lateral lifting belts 14C are driven in the rightward direction, and deliver the platen 50 from the lateral conveyance belts 15A to the lateral lifting belts 14C. The driving of the lateral lifting belts 14C in the rightward direction is stopped, the lateral lifting belts 14C are lowered, and the platen 50 is placed on the longitudinal belts 14A. Next, the longitudinal belts 14A convey the platen 50 toward the lateral lifting belts 14K.

After that, although not explained in detail, delivery operations are performed in the same manner as described above, and the platen 50 is sequentially delivered from the processing line 202 to the first return line 204, and from the first return line 204 to the second return line 205. Then, the platen 50 is delivered to the conveyance mechanism 11 of the shipment line 201, and returns to the preparation position 100. When the platen 50 is delivered toward the printer 4 or the printer 5, similar operations are performed.

Figure 2:
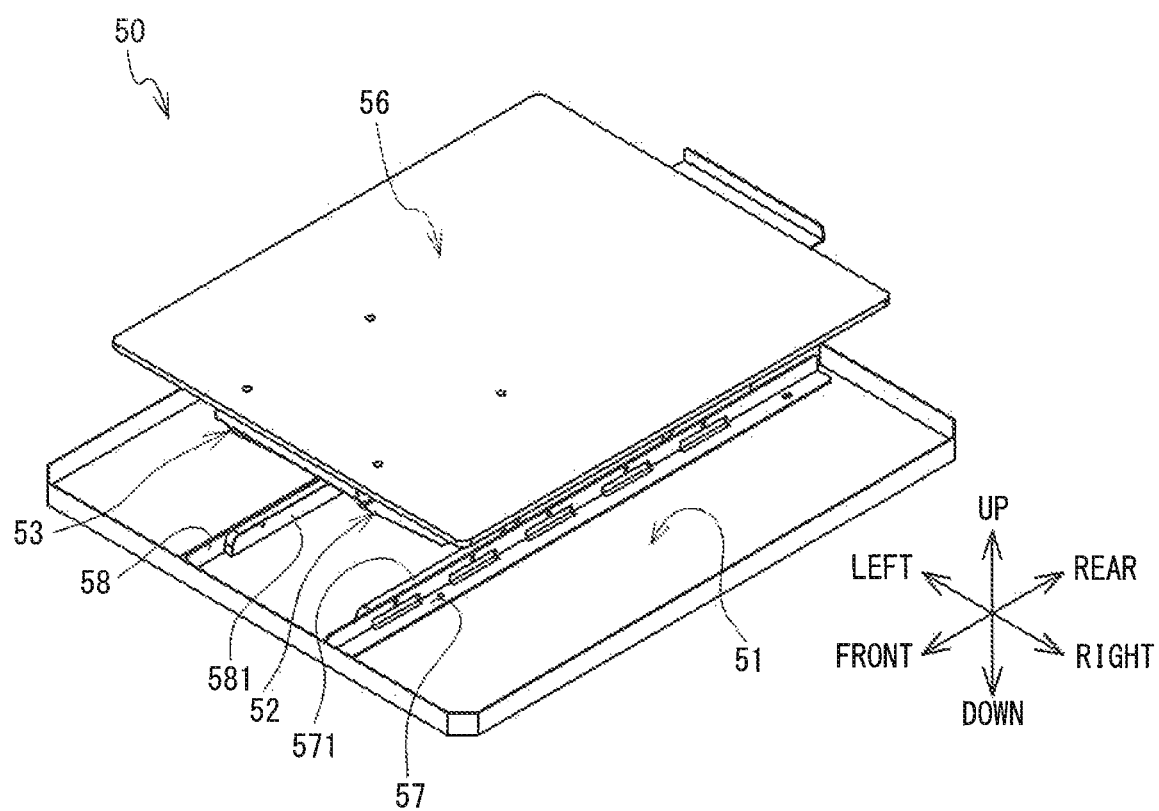
FIG. 2 is a perspective view of a platen 50.

The configuration of the platen 50 will be explained with reference to FIG. 2. The platen 50 is provided with a seat 51, a right side plate 52, a left side plate 53, a bottom plate (not shown in the drawings), a top plate (not shown in the drawings), and an attachment plate 56. The seat 51 has a rectangular shape in a plan view. At a substantially central portion in the left-right direction of the upper surface of the seat 51, a pair of support members (not shown in the drawings), which extend in the front-rear direction and which have an L-shaped cross section, are fixed to positions that are separated from each other in the left-right direction. The right side plate 52 has an inverted L shape in a right side view. On the upper surface of the seat 51, the right side plate 52 is fixed to an inner surface of the right-side support member (not shown in the drawings) using screws (not shown in the drawings) via a long and thin plate-shaped spacer 571 that extends in the front-rear direction. Thus, the right side plate 52 stands on the upper surface of the seat 51. An operator attaches the cloth P to the attachment plate 56. For example, when the cloth P is a T-shirt, the operator attaches the T-shirt to the attachment plate 56 such that a neck side of the T-shirt is directed to the front side and a hem side of the T-shirt is directed to the rear side.

In the same manner as the right side plate 52, on the upper surface of the seat 51, the left side plate 53 is fixed using screws (not shown in the drawings) via a long and thin plate-shaped spacer 581 that extends in the front-rear direction. Thus, the left side plate 53 stands on the upper surface of the seat 51 in parallel with the right side plate 52.

Electrical Configuration of Print System 1

An electrical configuration of the print system 1 will be explained with reference to FIG. 3. The print system 1 is provided with at least a conveyance control device 1A. The conveyance control device 1A is provided with the CPU 101, a ROM 102, a RAM 103, and drive circuits 121 to 127, which are mutually connected via a bus. A storage portion 104, the pretreatment device 2, the printers 3 to 5, an operation portion 110, an input-output portion 111, proximity sensors 70 to 77, the code reader 95, the longitudinal belt motor 131, the lateral belt motor 132, the lateral lifting belt motor 133, the lateral conveyance belt motor 134, the first lifting motor 135, the second lifting motor 136, and the conveyance motor 137 are connected to the conveyance control device 1A.

The CPU 101 controls operation of the print system 1. The ROM 102 stores various programs. The RAM 103 is a working memory and temporarily stores various types of information. The storage portion 104 is a non-volatile flash memory, and stores various types of information, such as a priority table 104A to be described later, and the like. The operation portion 110 receives various inputs by the operator. The operation portion 110 may be a touch panel (not shown in the drawings), and may display various types of information, in addition to receiving various inputs. The input-output portion 111 is provided with an SD memory card slot, a USB port, a serial port of another standard, and the like.

The drive circuit 121 controls operation of the longitudinal belt motor 131 on the basis of a control command from the CPU 101. The drive circuit 122 controls operation of the lateral belt motor 132 on the basis of a control command from the CPU 101. The drive circuit 123 controls operation of the lateral lifting belt motor 133 on the basis of a control command from the CPU 101. The drive circuit 124 controls operation of the lateral conveyance belt motor 134 on the basis of a control command from the CPU 101. The drive circuit 125 controls operation of the first lifting motor 135 on the basis of a control command from the CPU 101. The drive circuit 126 controls operation of the second lifting motor 136 on the basis of a control command from the CPU 101. The drive circuit 127 controls operation of the conveyance motor 137 on the basis of a control command from the CPU 101.

The proximity sensors 70 to 77 are respectively provided at the standby position 14F, on the first conveyance path 14G, the second conveyance path 15B, the third conveyance path 14H, the fourth conveyance path 17B, the fifth conveyance path 141, the sixth conveyance path 19B, and the seventh conveyance path 14J. The proximity sensors 70 to 77 detect the platen 50 and transmit a detection signal to the CPU 101. Note that a stepping motor may be used as each of the motors included in the platen conveyance mechanism 10. In this case, encoders are respectively connected to the motors, and motor position information is transmitted from each of the encoders to the CPU 101. Thus, the CPU 101 recognizes the positions of the respective motors.

Conveyance Control Processing and Conveyance Destination Determination Processing Next, conveyance control processing and conveyance destination determination processing will be explained with reference to FIG. 4 to FIG. 7. Note that, in the present embodiment, as an example, a case will be explained in which the platen 50, to which the cloth P has been attached, is conveyed to the shipment line 201, the processing line 202

(the pretreatment device 2 and one of the printers 3 to 5), the first return line 204, and the second return line 205, in that order.

Figure 4:
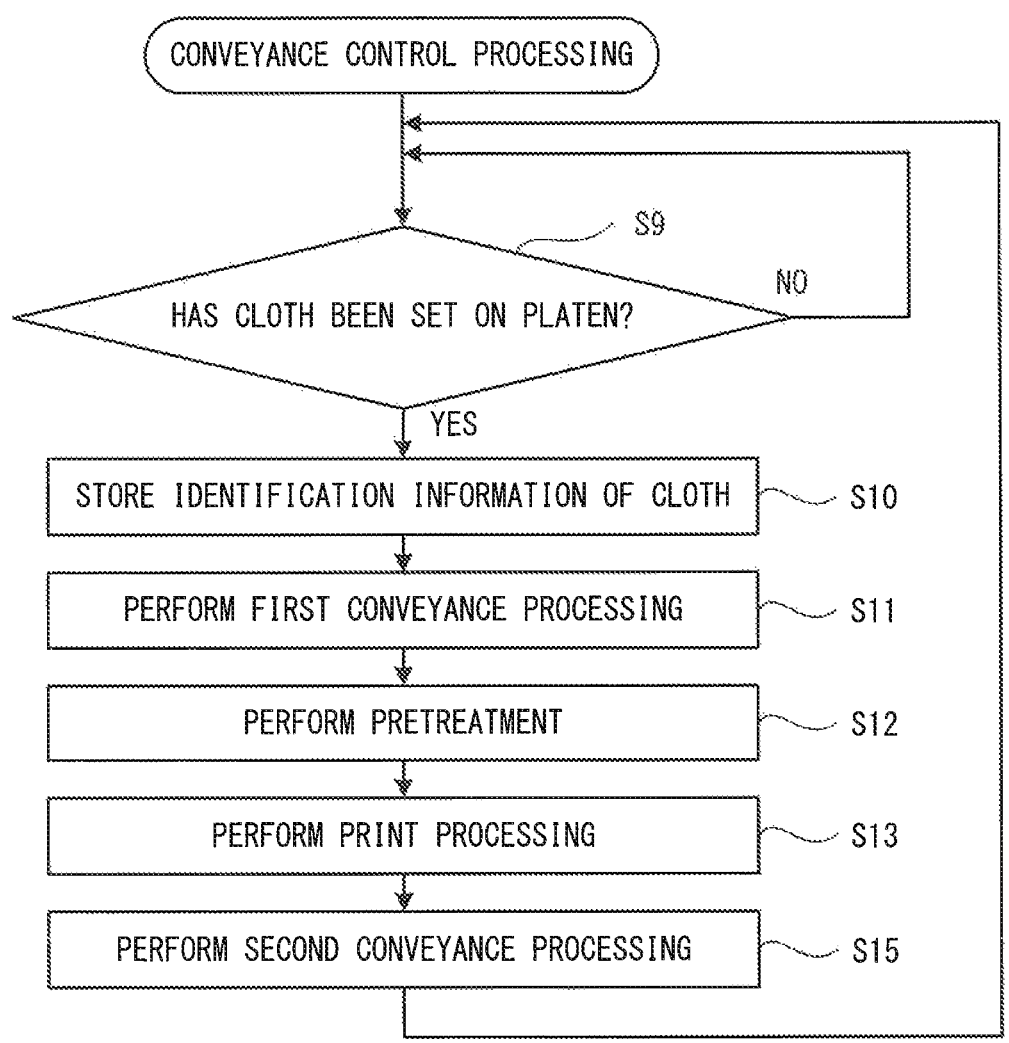
FIG. 4 is a flowchart of conveyance control processing.
Figure 5:
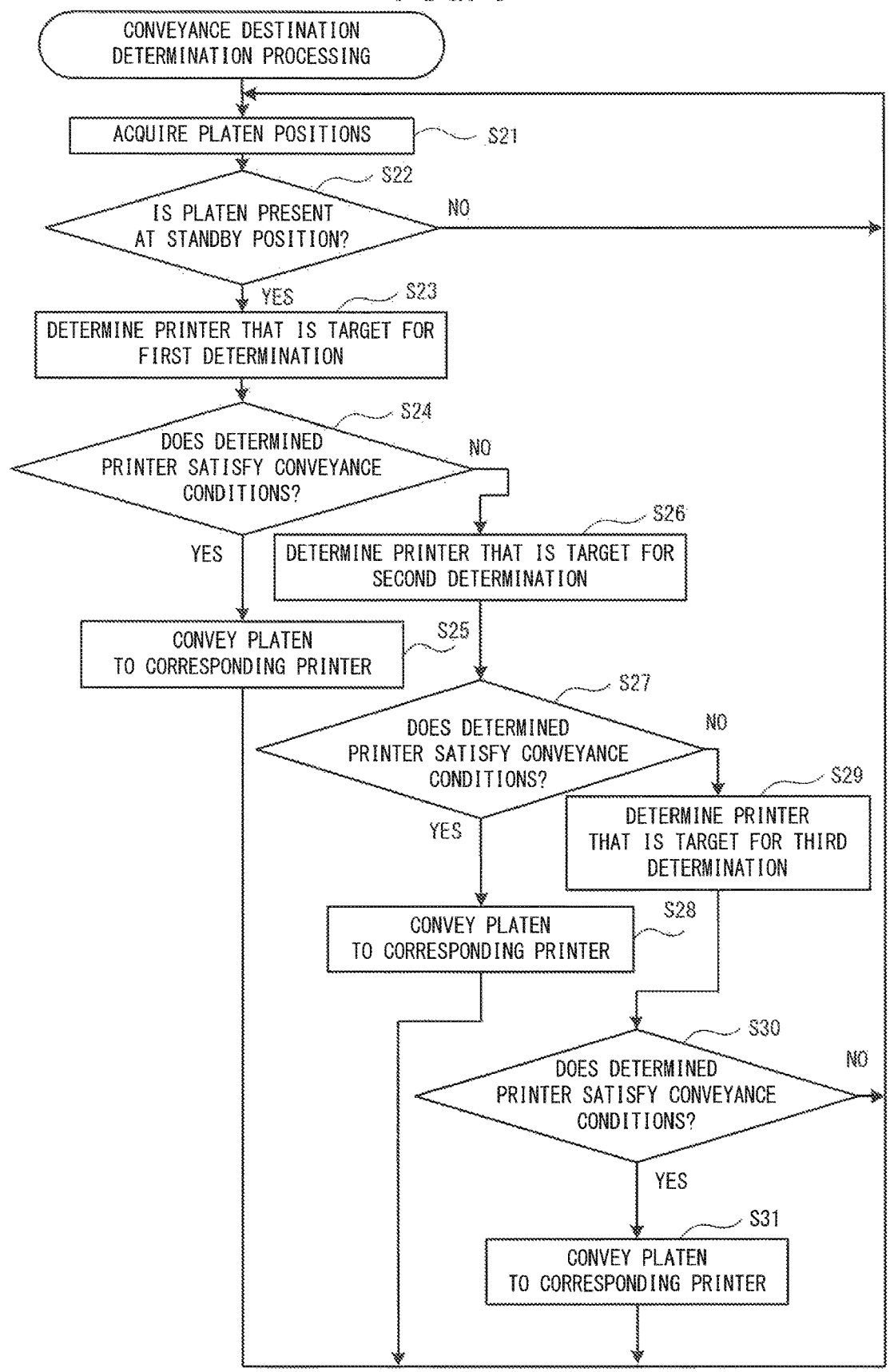
FIG. 5 is a flowchart of conveyance destination determination processing.

First, when a power source of the print system 1 is turned on, the CPU 101 reads out, from the ROM 102, a program for the conveyance control processing shown in FIG. 4 and a program for the conveyance destination determination processing shown in FIG. 5, and performs each of the conveyance control processing and the conveyance destination determination processing. The conveyance control processing will be explained with reference to FIG. 4. First, the CPU 101 determines whether a setting completion command, which indicates that the cloth P is placed on the platen 50 positioned at the preparation position 100, has been received (step S9). For example, when the operator uses the code reader 95 and reads out the identification information of the cloth P from a barcode or an RFID tag on the cloth P placed on the platen 50, the code reader 95 transmits the identification information to the CPU 101. When the CPU 101 receives the identification information of the cloth P from the code reader 95, the CPU 101 determines that the cloth P has been set on the platen 50 (yes at step S9). When a negative determination is made at step S9, the CPU 101 continues the determination processing at step S9. Next, the CPU 101 stores, in the RAM 103, the identification information of the cloth P received from the code reader 95 (step S10). Next, the CPU 101 performs first conveyance processing (step S11). The first conveyance processing is processing to convey the platen 50 disposed at the preparation position 100 to a start position of the processing line 202. For example, the start position is the position of the lateral lifting belts 14B of the conveyance mechanism 14. Note that the processing at step S10 may be performed before the processing at step S9.

Next, the CPU 101 performs the pretreatment using the pretreatment device 2 (step S12). The CPU 101 conveys the platen 50 using the conveyance mechanism 14, and causes the platen 50 to pass through the pretreatment device 2, thus performing the pretreatment on the cloth P attached to the platen 50. The CPU 101 causes the platen 50 that has passed through the pretreatment device 2 to stop at the position of the standby position 14F. At this time, the CPU 101 performs the conveyance destination determination processing shown in FIG. 5, and determines, from among the printers 3 to 5, the printer to which the platen 50 is to be conveyed, as described later. Next, the CPU 101 conveys the platen 50 to the printer determined by the conveyance destination determination processing, and causes the printing to be performed on the cloth P placed on the platen 50 (step S13). Next, the CPU 101 performs second conveyance processing (step S15) that causes the platen 50 after the printing to return to the preparation position 100 via the first return line 204 and the second return line 205. Note that the pretreatment shown at step S12 may be performed under control by a CPU (not shown in the drawings) provided in the pretreatment device 2, and the print processing shown at step S13 may be performed under control by CPUs (not shown in the drawings) that are respectively provided in the printers 3 to 5. In this case, in the pretreatment shown at step S12, the CPU 101 transmits a pretreatment execution command to the pretreatment device 2, and the pretreatment device 2 transmits status information, such as "pretreatment in progress," "pretreatment completion" or the like, to the CPU 101 of the conveyance control device 1A. When the CPU 101 receives the status information indicating "pretreatment completion" from the pretreatment device 2, the CPU 101 performs the print processing at step S13. In the print processing shown at step S13 also, the CPU 101 transmits a print processing execution command to the printers 3 to 5, and the printers 3 to 5 transmit status information, such as "printing in progress," "printing completion" or the like, to the CPU 101 of the conveyance control device 1A. When the CPU 101 receives the status information indicating "printing completion" from the printers 3 to 5, the CPU 101 may perform the second conveyance processing at step S15.

The conveyance destination determination processing will be explained with reference to FIG. 5. First, the CPU 101 acquires positions of each of the platens 50 that have already been transferred and conveyed, from each of the proximity sensors 70 to 77 and each of the printers 3 to 5 that are provided in the platen conveyance mechanism 10 of the print system 1 (step S21). Next, the CPU 101 determines whether the platen 50 is in the standby position 14F (step S22). For example, when the detection signal of the platen 50 is received from the proximity sensor 70 disposed at the standby position 14F, the CPU 101 determines that the platen 50 is in the standby position 14F. When the CPU 101 determines that the platen 50 is not in the standby position 14F (no at step S22), the CPU 101 returns the processing to step S21.

When the CPU 101 determines that the platen 50 is in the standby position 14F (yes at step S22), the CPU 101 determines, from the printers 3 to 5, the printer that is a target for first determination (step S23). At step S24 to be described later, the CPU 101 determines whether or not to convey the platen 50 to the printer determined at step S23. The determination at step S24 will be referred to as the first determination. The CPU 101 determines the printer that is the target for the first determination, by performing selection from the printer having a higher priority in the priority table 104A shown in FIG. 6. The priority table 104A is a table used by the CPU 101 to determine the printer to which the platen 50 is to be conveyed by priority. An example of the priority table 104A will be explained with reference to FIG. 6. The priority table 104A is created in advance and stored in the storage portion 104. States of the printers, an order of priority, details of the states, and supplementary information are stored in the priority table 104A. The printers include printers that have indicated a printable state and printers that have indicated an unprintable state. For example, the printers that have indicated the printable state are ranked first to fifth in the order of priority, and the smaller the number, the higher the priority. The first priority indicates that the printing can be immediately performed by the printer and that the platen 50 is not present in the printer. The second priority indicates that the printing is being performed by the printer, and that it will take 20 seconds or less until the printing is complete. The third priority indicates that the printing is being performed by the printer, and that it will take 20 seconds or more and 40 seconds or less until the printing is complete. The fourth priority indicates that the printing is being performed by the printer, and that it will take 10 seconds to convey the platen 50 into the printer and thereafter it will take 40 seconds or more and 60 seconds or less until the printing is complete. The fifth priority indicates that an operation other than the printing operation, such as a maintenance operation, is being performed on the printer, and that 30 seconds are required for the operation and thereafter it will take 40 seconds or more and 60 seconds or less until the printing is complete. Examples of the maintenance operation include flushing of the ink before the printing, wiping of the head, and the like. The maintenance operation is performed each time twenty recording media are printed, for example. The printable state is prescribed in advance using, as a reference, a time period required to complete the printing, for example. The printable state includes, for example, a case in which the printing can be immediately started by the printer, and a case in which, although other printing is currently being performed and the printing cannot be immediately started, new printing can be started after a predetermined time period and the printing can be completed within a predetermined time period. The unprintable state is a case other than the printable state.

The printers that have indicated the unprintable state include printers that are ranked sixth to eighth in the order of priority, and three printers that are out of target (denoted by an × mark). The smaller the number, the higher the priority. Operations during which the printing by the printers 3 to 5 is impossible include a periodic operation that is performed periodically and an irregular operation that is performed on an irregular basis. With respect to the periodic operation, estimation of an end time is possible, and with respect to the irregular operation, the estimation of the end time is impossible. The periodic operation is, for example, a related operation of which the end time can be calculated. Examples of the related operation include a periodic replenishment operation of the ink that is supplied to the printers 3 to 5, and the maintenance operation for the printers 3 to 5. The maintenance operation that is completed within 30 seconds or less may correspond to the fifth priority. Examples of the maintenance operation include a periodic purge operation that sucks up the ink from nozzles (not shown in the drawings) of the head (not shown in the drawings), a periodic flushing operation that ejects the ink from the nozzles of the head, a periodic wipe operation that wipes a nozzle surface (not shown in the drawings) of the head using a wiper, a periodic circulation operation that circulates the ink inside an ink supply path (not shown in the drawings) and the head, and a periodic agitation operation that agitates the ink inside an ink tank (not shown in the drawings). The maintenance operation may be a periodic operation regardless of the maintenance completion time. The related operation is a carrying-in operation or a carrying-out operation of the platen 50 at the preparation position 100.

The sixth priority indicates that periodic replacement of an ink cartridge is in progress or that the replenishment of the ink to the ink tank is in progress. The seventh priority indicates that the platen 50 is being discharged from the printer. The eighth priority indicates that the purging of the ink from the head (not shown in the drawings) is in progress. The periodic purge operation is performed once in six to seven hours, for example, and it takes about five to six minutes. The sixth to eighth priorities indicate the periodic operation of the printer. "Out of target" (denoted by the x mark) indicates the irregular operation, and indicates the power source OFF of the printer, a MACHINE ERROR such as ink empty, and opening of a printer cover.

In the determination at step S23, the CPU 101 communicates with the printers 3 to 5 and receives the status information from the printers 3 to 5. The CPU 101 acquires the states of the printers 3 to 5, and determines which of the priorities in the priority table 104A the printers 3 to 5 each correspond to. Further, the CPU 101 determines, as the printer for which the first determination is to be performed, the printer having a smaller priority number (a higher priority). For example, when each of the printers 3 to 5 is performing printing with respect to the platen 50 that has already been conveyed, the CPU 101 may calculate a completion time of the print processing for the platen 50 that has already been conveyed, and may calculate a time period until the printing can be started by the printer. Then, the CPU 101 may determine which of the second to fifth priorities in the priority chart 104A the printers 3 to 5 correspond to. For example, when the printer 3 corresponds to the third priority, the printer 4 corresponds to the first priority, and the printer 5 corresponds to the fifth priority, the CPU 101 determines the printer 4, which corresponds to the first priority, as the printer that is the target for the first determination (step S23). When the priorities of the printers are the same as each other, the CPU 101 determines, for example, the printer closer to the standby position 14F as the printer that is the target for the first determination. It is desirable that, in the priority table 104A, all the states of the printers 3 to 5 are classified and prescribed in advance. However, in the determination at step S23, if the states of the printers 3 to 5 do not correspond to any one of the states in the priority table 104A, the CPU 101 may treat the priorities of the printers 3 to 5 as "×" for example. In this case, the CPU 101 may advance the processing to step S24. Alternatively, instead of advancing the processing to step S24, the CPU 101 may return the processing to step S21.

Next, the CPU 101 determines whether the printer 4 determined at step S23 satisfies conveyance conditions (step S24). The conveyance conditions under which the platen 50 can be conveyed to each of the printers 3 to 5 will be explained with reference to FIG. 7(A) to FIG. 7(C). The tables shown in FIGS. 7(A) to 7(C) are tables showing the conveyance conditions to the printers 3 to 5. The tables shown in FIG. 7(A) to FIG. 7(C) are created in advance and stored in the storage portion 104. In the tables in FIG. 7, (ENTER) indicates that the conveyance path is used by the platen 50 that moves toward the printer. (EXIT) indicates that the conveyance path is used by the platen 50 discharged from the printer. "–" indicates that the platen 50 is not present at a particular position, such as the standby position 14F. "×" indicates that, when the platen 50 is present on the conveyance path or in the printer, the platen 50 at the standby position 14F is not to be conveyed to the printer. "Any" indicates that this item is not used as a determination factor for the conveyance of the platen 50 at the standby position 14F. In other words, "Any" indicates that the conveyance is possible regardless of whether another of the platens 50 is present on the conveyance path or in the printer. "GO" indicates that, although another of the platens 50 is present on the conveyance path or in the printer, the conveyance is possible when predetermined conditions are satisfied. Therefore, when the other platen 50 is present on the conveyance path or in the printer, when the predetermined conditions are not satisfied, "×" is assigned.

For example, as shown in FIG. 7(B), conditions under which the CPU 101 can convey the platen 50 from the standby position 14F to the printer 4 are as follows. The platen 50 is not present on the first conveyance path 14G. The platen 50 moving toward the printer 3 is not present on the second conveyance path 15B. The platen 50 after the completion of printing is not present in the printer 3. The platen 50 discharged from the printer 3 is not present on the second conveyance path 15B. The platen 50 moving toward the fourth conveyance path 17B is not present on the third conveyance path 14H. The platen 50 moving toward the printer 4 is not present on the fourth conveyance path 17B. The platen 50 is not present in the printer 4. Then, with respect to whether or not the platen 50 is present on the fourth conveyance path 17B (EXIT), the fifth conveyance path 141, the sixth conveyance path 19B (ENTER), the printer 5, the sixth conveyance path 19B (EXIT), and the seventh conveyance path 14J, "Any" is assigned to each of these items. Each of these items does not relate to the conditions under which the platen 50 can be conveyed from the standby position 14F to the printer 4, and therefore is not used as the determination factor for the conveyance of the platen 50 at the standby position 14F.

Note that, when the printer 3 is performing printing, is under maintenance, or is out of order, "GO" is assigned. Therefore, the CPU 101 can convey the platen 50 to the printer 4. In a similar manner, even when the platen 50 moving toward the fifth conveyance path 141 is present on the third conveyance path 14H, since "GO" is assigned, the CPU 101 can convey the platen 50 to the printer 4. In the conveyance conditions shown in FIG. 7(B), when the platen 50 is present in the printer 4, it is indicated that the conveyance conditions are not satisfied. However, the present disclosure is not limited thereto. "Any" may be assigned to corresponding items of the printer 3 in the conveyance conditions to the printer 3 shown in FIG. 7(A), corresponding items of the printer 4 in the conveyance conditions to the printer 4 shown in FIG. 7(B), and corresponding items of the printer 5 in the conveyance conditions to the printer 5 shown in FIG. 7(C). The corresponding items may be prescribed in association with the priority table 104A shown in FIG. 6. For example, the first to third priorities shown in FIG. 6 may be "GO" in FIG. 7, and the fourth to eighth priorities and "×" shown in FIG. 6 may be "×" in FIG. 7.

When any of the conveyance conditions for the platen positions acquired at step S21 is "GO" or "Any," the CPU 101 determines that the printer 4 determined at step S23 satisfies the conveyance conditions (yes at step S24). Thus, the CPU 101 determines that the printer 4 is the conveyance destination of the platen 50 (yes at step S24). Next, the CPU 101 conveys the platen 50 from the standby position 14F toward the printer 4 (step S25). The platen 50 moves from the standby position 14F to the printer 4 via the first conveyance path 14G, the third conveyance path 14H, and the fourth conveyance path 17B. When the CPU 101 determines NO in the determination at step S24, the CPU 101 determines the printer that is a target for second determination (step S26). At step S27, the CPU 101 determines whether or not to convey the platen 50 to the printer determined at step S26. The determination at step S27 will be referred to as the second determination. The processing at step S26 is similar to that at step S23. For example, when the printer 3 corresponds to the third priority, the printer 4 corresponds to the first priority, and the printer 5 corresponds to the fifth priority, the CPU 101 determines the printer 3, which is the printer following the printer 4 in the order of priority, as the printer that is the target for the second determination (step S26). Next, the CPU 101 determines whether the printer 3 determined at step S26 satisfies the conveyance conditions (step S27).

For example, as shown in FIG. 7 (A), conditions under which the CPU 101 can convey the platen 50 from the standby position 14F to the printer 3 are as follows. The platen 50 is not present at the standby position 14F. The platen 50 is not present on the first conveyance path 14G. The platen 50 moving toward the printer 3 is not present on the second conveyance path 15B. The platen 50 is not present in the printer 3. The platen 50 discharged from the printer 3 is not present on the second conveyance path 15B. Then, with respect to whether or not the platen 50 is present on the third conveyance path 14H, the fourth conveyance path 17B (ENTER), the printer 4, the fourth conveyance path 17B (EXIT), the fifth conveyance path 141, the sixth conveyance path 19B (ENTER), the printer 5, the sixth conveyance path 19B (EXIT), and the seventh conveyance path 14J, "Any" is assigned to each of these items. Each of these items does not relate to the conditions under which the platen 50 can be conveyed from the standby position 14F to the printer 3, and therefore is not used as the determination factor for the conveyance of the platen 50 at the standby position 14F.

When any of the conveyance conditions for the platen positions acquired at step S21 is "GO" or "Any," the CPU 101 determines that the printer 3 determined at step S26 satisfies the conveyance conditions (yes at step S27). Thus, the CPU 101 determines that the printer 3 is the conveyance destination of the platen 50 (yes at step S27). Next, the CPU 101 conveys the platen 50 from the standby position 14F toward the printer 3 (step S28). The platen 50 is conveyed from the standby position 14F to the printer 3 via the first conveyance path 14G and the second conveyance path 15B. When the CPU 101 determines NO in the determination at step S27, the CPU 101 determines the printer that is a target for third determination (step S29). At step S30, the CPU 101 determines whether or not to convey the platen 50 to the printer determined at step S29. The determination at step S30 will be referred to as the third determination. The processing at step S29 is similar to that at step S23 and step S26. When the printer 3 corresponds to the third priority, the printer 4 corresponds to the first priority, and the printer 5 corresponds to the fifth priority, the CPU 101 determines the printer 5, which is the printer following the printer 3 in the order of priority, as the printer that is the target for the third determination (step S29). Next, on the basis of the platen positions acquired at step S21, the CPU 101 determines whether the printer 5 determined at step S29 satisfies the conveyance conditions (step S30).

As shown in FIG. 7 (C), conditions under which the CPU 101 can convey the platen 50 from the standby position 14F to the printer 5 are as follows. The platen 50 is not present at the standby position 14F. The platen 50 is not present on the first conveyance path 14G. The platen 50 that is on the second conveyance path 15B to move toward the printer 3 is not used as the determination factor. The platen 50 after the completion of printing is not present in the printer 3. The platen 50 discharged from the printer 3 is not present on the second conveyance path 15B. The platen 50 moving toward the sixth conveyance path 19B is not present on the third conveyance path 14H. The platen 50 that is on the fourth conveyance path 17B to move toward the printer 4 is not used as the determination factor. The platen 50 after the completion of printing is not present in the printer 4. The fourth conveyance path 17B (EXIT) is not used as the determination factor. The platen 50 moving toward the sixth conveyance path 19B is not present on the fifth conveyance path 141. The platen 50 is not present on the sixth conveyance path 19B (ENTER) and in the printer 5. The sixth conveyance path 19B (EXIT) and the seventh conveyance path 14J are not used as the determination factor. Note that, when the printer 3 is performing printing, is under maintenance, or is out of order, "GO" is assigned. Therefore, the CPU 101 can convey the platen 50 to the printer 5. In a similar manner, even when the platen 50 moving toward the fourth conveyance path 17B or the seventh conveyance path 14J is present on the third conveyance path 14H, since "GO" is assigned, the CPU 101 can convey the platen 50 to the printer 5. When the printer 4 is performing printing, is under maintenance, or is out of order, since "GO" is assigned, the CPU 101 can convey the platen 50 to the printer 5. When the platen 50 moving toward the seventh conveyance path 14J is present on the fifth conveyance path 141, since "GO" is assigned, the CPU 101 can convey the platen 50 to the printer 5.

When any of the conveyance conditions for the platen positions acquired at step S21 is "GO" or "Any," the CPU 101 determines that the printer 5 determined at step S29 satisfies all the conveyance conditions (yes at step S30). Thus, the CPU 101 determines that the printer 5 is the conveyance destination of the platen 50 (yes at step S30). Next, the CPU 101 conveys the platen 50 from the standby position 14F toward the printer 5 (step S31). The platen 50 is conveyed from the standby position 14F to the printer 5 via the first conveyance path 14G, the third conveyance path 14H, the fifth conveyance path 141 and the sixth conveyance path 19B. When the CPU 101 determines NO in the determination at step S30, the CPU 101 returns the processing to step S21. Thus, the CPU 101 repeats the processing from step S21 to step S30 in the same manner as described above until the printer to which the platen 50 can be conveyed is determined. Also after the processing at step S25, step S28 and step S31, The CPU 101 returns the processing to step S21, and then determines the conveyance destination of the platen 50 that comes to the standby position 14F.

As explained above, the CPU 101 of the print system 1 of the present embodiment performs the determination steps S24, S27 and S30 to determine which of the plurality of printers 3 to 5 the platen 50 is to be conveyed to. Therefore, the conveyance destinations of the platens 50 are allocated to the plurality of printers 3 to 5. Thus, the conveyance of the platens 50 to a specific printer only is avoided, and a print processing volume in a certain period is increased.

In the determination processing at step S24, step S27 and step S30, the CPU 101 determines the conveyance destination of the platen 50 on the basis of the states of the plurality of printers 3 to 5. Therefore, the conveyance destinations of the platens 50 can be allocated on the basis of the states of the printers 3 to 5, and the print processing volume in the certain period is increased.

In the processing at step S23, step S26 and step S29, the CPU 101 refers to the priorities in the priority table 104A and determines the conveyance destination of the platen 50. The time period required to complete the printing, the conveyance time period, and the maintenance time period are prescribed in association with the first to fifth priorities in the priority table 104A, and the time period until the printing can be started using the platen 50 conveyed from the standby position 14 relates to those time periods. Therefore, the conveyance destination of the platen 50 is determined on the basis of the time period required until the printing can be started. When the platen 50 is conveyed to the printer that can start the printing earlier, the print processing volume in the certain period is increased.

In the processing at step S23, step S26, and step S29, the CPU 101 acquires the states of the printers 3 to 5, calculates the completion time of the print processing for the platen 50 that has already been conveyed, obtains the time period until the printing is to be started by each of the printers based on the completion time, and determines the conveyance destination of the platen 50 on the basis of the time period until the printing is to be started by each of the printers. Therefore, when the platen 50 is conveyed to the printer with which the print processing will be complete in a shortest time, the print processing volume in the certain period is increased.

In the processing at step S23, step S26 and step S29, the CPU 101 may determine, as the conveyance destination of the platen 50, only one of the printers that have indicated the printable state, and may determine that the printer that has not indicated the printable state is not the conveyance destination of the platen 50. In this case, the possibility of a reduction in the print processing volume in the certain period resulting from the platen 50 being conveyed to the printer in the unprintable state is reduced.

In the processing at step S21, the CPU 101 acquires the positions of the platens 50 that have already been conveyed by the platen conveyance mechanism 10. In accordance with the determination at step S24, step S27 and step S30 and on the basis of the positions of the platens 50 acquired at step S21, the CPU 101 conveys the platen 50 to one of the plurality of printers 3 to 5. It is thus possible to avoid mutual collision of the platens 50, and the possibility of a reduction in the print processing volume in the certain period resulting from the mutual collision of the platens 50 is reduced.

In the determination at step S24, step S27 and step S30, on the basis of the conveyance conditions shown in FIG. 7(A) to FIG. 7(C), the CPU 101 determines that the conveyance of the platen 50 is to be performed so as to avoid a situation in which the conveyance path of the already conveyed platen 50 overlaps with the conveyance path of the platen 50 to be conveyed, and so as to avoid the collision with the already conveyed platen 50 on the conveyance path on which the platen 50 is to be conveyed. Of each of the conveyance paths, the "conveyance path" refers to a conveyance path along which the platen 50 passes when the platen 50 is conveyed from the preparation position 100, which is the conveyance start position, to one of the printers 3 to 5 via the pretreatment device 2 and is returned again to the preparation position 100. Therefore, the possibility of the collision of the already conveyed platen 50 with the platen 50 to be conveyed from the standby position 14F is reduced, and the print processing volume in the certain period is increased.

In the determination at each of the determination steps S24, S27 and S30, on the basis of the states of the plurality of printers, the CPU 101 refers to the priority table 104A and determines the printer that is the target for the first determination, the printer that is the target for the second determination, and the printer that is the target for the third determination. In other words, on the basis of the states of the plurality of printers, the CPU 101 changes an order of the printers used to determine (step S24, step S27 and step S30) which of the printers the platen 50 is to be conveyed to. Therefore, the CPU 101 can determine whether to convey the platen 50, in order from the printer having a higher possibility of becoming printable.

In the above-described embodiment, the conveyance control device 1A is an example of a "conveyance control device" of the present invention. The CPU 101 is an example of a "computer" or a "processor" of the present invention. Step S24, step S27 and step S30 are an example of "determination processing" of the present invention. The printer having a smaller priority number is an example of a "printer with which print processing will be complete in a shortest time" of the present invention. The printers corresponding to the sixth to eighth priorities are an example of a "printer with which printing is impossible due to a periodic operation" of the present invention. The platen conveyance mechanism 10 is an example of a "conveyance portion" of the present invention. The preparation position 100 is an example of a "conveyance start position" of the present invention.

The present disclosure is not limited to the above-described embodiment and various modifications are possible. In the above-described embodiment, when the CPU 101 determines that even the printer that is the target for the third determination does not satisfy the conveyance conditions (no at step S30), the CPU 101 returns the processing to step S21. However, at the determination steps S24, S27 and S30, when the CPU 101 determines that there is no printer that has indicated the printable state, the CPU 101 may convey the platen 50 to the printer with which the printing is impossible due to the periodic operation. This avoids a situation in which the platen 50 is not conveyed to the printer, and thus reduces the possibility of a reduction in the print processing volume in the certain period.

At the determination steps shown in FIG. 8, when the CPU 101 determines that there is no printer that has indicated the printable state (no at step S24, step S26, no at step S27, step S29, no at step S30), without using the priority table 104A, the CPU 101 may determine the printers that are the targets for the first determination to the third determination in the following manner. For example, the CPU 101 may calculate the end time of the related operation relating to a printing function of each of the printers 3 to 5 (step S32). Next, the CPU 101 may convey the platen 50 to the printer which cannot currently perform the printing due to the related operation, but for which the end time of the related operation is earliest (step S33). When the end time of the related operation is the same, the CPU 101 may convey the platen 50 to the printer that is closer to the standby position 14F. When the end time of the related operation is the same, the CPU 101 may convey the platen 50 to the printer that has been specified in advance. Therefore, when there is no printer that has indicated the printable state, the CPU 101 conveys the platen 50 to the printer that has indicated the unprintable state due to the periodic operation that is the related operation of which the end time can be calculated. The related operation is relating to the printing function of the printer. Thus, a situation is avoided in which the platen 50 is not conveyed to the printer, and the possibility of a reduction in the print processing volume in the certain period is reduced.

In the determination at step S23, without using the priority table 104A, the CPU 101 may calculate the completion time of the print processing for the platen 50 that has already been conveyed, obtain the time period until the printing is to be started by each of the printers based on the completion time, and determine the printer that is the target for the first determination on the basis of the time period until the printing is to be started by each of the printers. For example, the time period until the printing is to be started by each of the printers may be the difference between the completion time of the print processing for the platen 50 and the time at the time of the determination at step S23. The print system 1 of the above-described embodiment may be provided with a post-treatment device on the seventh conveyance path 14J. The post-treatment device is disposed to the rear of the printers 3 to 5, and heats the printed cloth P placed on the platen 50 at a high temperature. Thus, the ink dries and the fixation of the ink on the cloth P is improved. The pretreatment device 2 may be provided with the application portion only. The platen conveyance mechanism 10 may be provided with a right-side processing line to the right of the processing line 202 such that it is symmetric with the processing line 202. The right-side processing line is provided with three printers in the same manner as the processing line 202. Another set of the processing line 202 and the right-side processing line may be provided.

The proximity sensors 70 to 77 may be infrared sensors. The platen position acquisition processing (step S21) of the conveyance destination determination processing shown in FIG. 5 may be performed by estimating the positions of the platens 50 on the basis of a conveyance amount of each of the platens 50, without using the proximity sensors 70 and 77. The priority table 104A is not limited to that shown in FIG. 6. The operator may create a priority table as appropriate in advance. In the processing at step S23, step S26 and step S29, when there are a plurality of the printers having the same priority level, instead of selecting the printer closer to the standby position 14F, the CPU 101 may select the printer for which a selection order is specified in advance. The conveyance conditions under which the platen 50 is conveyed to each of the printers 3 to 5 is not limited to those shown in FIG. 7(A) to FIG. 7(C). It is sufficient that the conveyance conditions be conditions that avoid mutual collision of the platen 50 to be conveyed with the already conveyed platen 50. In the determination at step S23, when all the printers 3 to 5 that have indicated the unprintable state, the CPU 101 may determine, as the printer that is the target for the first determination, the printer having the highest priority among the printers that correspond to the sixth to eighth priorities and that have indicated the unprintable state due to the periodic operation, for example. This also applies the processing at step S26 and step S29.

Although the conveyance destination determination processing in FIG. 5 is performed by the CPU 101, CPUs other than the CPU 101 may be respectively provided in the conveyance mechanisms 14, 15, 17 and 19, and the conveyance destination determination processing may be performed by the CPUs. The number of the printers on the processing line 202 is not limited to three, and a given number of the printers, such as two, four or five printers, may be provided. When the number of the printers is increased, the print processing volume in the certain period is increased. Although the three determination steps (step S24, step S27, step S30) are provided, the number of the determination steps is not necessarily limited to three and may be one or two. The number of the determination steps may be the same as the number of the printers on the processing line 202, and when there are five printers, the number of the determination steps may be five. Even when there are the five printers, the number of the determination steps may be three or four. The determination as to whether the cloth P has been set on the platen (step S9) may be made when the operator places the cloth P on the platen 50 and inputs a set completion command from the operation portion 110 and the CPU 101 receives the set completion command. Although the CPU 101 acquires the states of the printers 3 to 5 in the determination at step S23, the CPU 101 may acquire the states of the printers 3 to 5 at step S26 and step S29 also, and may use the acquired states in the processing at step S26 and step S29.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A conveyance control device comprising:
 a processor configured to control a conveyance portion, the processor being communicatively connected to the conveyance portion, the conveyance portion being configured to convey a platen from a conveyance start position of the platen to one of a plurality of printers via a pretreatment device, the pretreatment device being configured to perform pretreatment on a recording medium placed on the platen; and a memory storing computer-readable instructions that, when executed by the processor, perform processes including:

performing determination processing of determining which of the plurality of printers the platen is to be conveyed to such that printing is performed by a determined printer and is not performed by undetermined printer before being performed by the determined printer, wherein one of the plurality of printers is configured with a plurality of print heads aligned in a horizontal direction, each of the print heads is configured to eject a different specific color of ink, another of the plurality of printers is configured with a plurality of print heads aligned in a horizontal direction, each of the print heads is configured to eject the different specific color of ink, wherein the conveyance portion comprises:

a first conveyance mechanism; and a plurality of second conveyance mechanisms branched from the first conveyance mechanism, each of the plurality of the second conveyance mechanisms having one end connected to the first conveyance mechanism and another end opposite to the one end connected to a corresponding one of the plurality of printers such that whichever one of the plurality of the printers the platen is conveyed to is conveyed via the second conveyance mechanism connected to the determined printer and is not conveyed via the second conveyance mechanism connected to the undetermined printer.

2. The conveyance control device according to claim 1, wherein the processor, in the determination processing, on a basis of the states of the plurality of printers, changes an order of the printers used to determine which of the printers the platen is to be conveyed to.

3. The conveyance control device according to claim 1, wherein the processor, in the determination processing, on a basis of states of the plurality of printers, determines which of the plurality of printers the platen is to be conveyed to.

4. The conveyance control device according to claim 3, wherein the processor, in the determination processing, on a basis of a time period until printing is to be started by each of the plurality of printers, determines which of the plurality of printers the platen is to be conveyed to.

5. The conveyance control device according to 3, wherein the instructions further perform processes including:

calculating a completion time of print processing for the platen that has already been conveyed; and obtaining the time period until the printing is to be started by each of the printers based on the completion time, wherein the processor, in the determination processing, determines which of the plurality of printers the platen is to be conveyed to on the basis of the time period until the printing is to be started by each of the printers.

6. The conveyance control device according to claim 3, wherein the processor, in the determination processing, among the plurality of printers, determines which of the printers that have indicated a printable state the platen is to be conveyed to.

7. The conveyance control device according to claim 6, wherein the processor causes the platen to be conveyed to the printer that has indicated an unprintable state due to a periodic operation, in the determination processing, when the processor determines that there is no printer that has indicated the printable state.

8. The conveyance control device according to claim 7, wherein the processor causes the platen to be conveyed to the printer that has indicated the unprintable state due to the periodic operation, the periodic operation being a related operation of which an end time can be calculated, the related operation relating to a printing function of the printer.

9. The conveyance control device according to claim 1, wherein the processor determines which of the plurality of printers the platen is to be conveyed to, on a basis of a position of the platen that has already been conveyed by the conveyance portion.

10. The conveyance control device according to claim 9, wherein the processor, in the determination processing, determines to cause the conveyance of the platen that does not collide with the already conveyed platen on a conveyance path on which the platen is to be conveyed.

11. The conveyance control device according to claim 1, wherein the ink of the specific color is any one of yellow, cyan, or magenta ink.

12. A conveyance control method in which a processor controls a conveyance portion, the processor being communicatively connected to the conveyance portion, the conveyance portion being configured to convey a platen from a conveyance start position of the platen to one of a plurality of printers via a pretreatment device, the pretreatment device being configured to perform pretreatment on a recording medium placed on the platen, the conveyance control method comprising:

determination processing of determining which of the plurality of printers the platen is to be conveyed to such that printing is performed by a determined printer and is not performed by undetermined printer before being performed by the determined printer, wherein one of the plurality of printers is configured with a plurality of print heads aligned in a horizontal direction, each of the print heads is configured to eject a different specific color of ink, another of the plurality of printers is configured with a plurality of print heads aligned in a horizontal direction, each of the print heads is configured to eject the different specific color of ink, wherein the conveyance portion comprises:

a first conveyance mechanism; and a plurality of second conveyance mechanisms branched from the first conveyance mechanism, each of the plurality of the second conveyance mechanisms having one end connected to the first conveyance mechanism and another end opposite to the one end connected to a corresponding one of the plurality of printers such that whichever one of the plurality of the printers the platen is conveyed to is conveyed via the second conveyance mechanism connected to the determined printer and is not conveyed via the second conveyance mechanism connected to the undetermined printer.

13. The conveyance control method according to claim 12, wherein the ink of the specific color is any one of yellow, cyan, or magenta ink.

14. A transitory computer-readable medium storing computer-readable instructions that, when executed by a computer, which controls a conveyance portion, the computer being communicatively connected to the conveyance portion, the conveyance portion being configured to convey a platen from a conveyance start position of the platen to one of a plurality of printers via a pretreatment device, the pretreatment device being configured to perform pretreatment on a recording medium placed on the platen, perform:

determination processing of determining which of the plurality of printers the platen is to be conveyed to such that printing is performed by a determined printer and is not performed by undetermined printer before being performed by the determined printer, wherein one of the plurality of printers is configured with a plurality of print heads aligned in a horizontal direction, each of the print heads is configured to eject a different specific color of ink, another of the plurality of printers is configured with a plurality of print heads aligned in a horizontal direction, each of the print heads is configured to eject the different specific color of ink, wherein the conveyance portion comprises:

a first conveyance mechanism; and a plurality of second conveyance mechanisms branched from the first conveyance mechanism, each of the plurality of the second conveyance mechanisms having one end connected to the first conveyance mechanism and another end opposite to the one end connected to a corresponding one of the plurality of printers such that whichever one of the plurality of the printers the platen is conveyed to is conveyed via the second conveyance mechanism connected to the determined printer and is not conveyed via the second conveyance mechanism connected to the undetermined printer.

15. The transitory computer-readable medium storing computer-readable instructions according to claim 12, wherein the ink of the specific color is any one of yellow, cyan, or magenta ink.

\* \* \* \* \*